(12) United States Patent
Jasmann et al.

(10) Patent No.: US 11,597,311 B1
(45) Date of Patent: Mar. 7, 2023

(54) FUEL REFILLING SYSTEM FOR A REFRIGERATED TRAILER

(71) Applicants: Eric Jasmann, Mount Holly, NC (US); Charlene Jasmann, Mount Holly, NC (US)

(72) Inventors: Eric Jasmann, Mount Holly, NC (US); Charlene Jasmann, Mount Holly, NC (US)

(*) Notice: Subject to any disclaimer, the term of this patent is extended or adjusted under 35 U.S.C. 154(b) by 309 days.

(21) Appl. No.: 17/013,929

(22) Filed: Sep. 8, 2020

(51) Int. Cl.
*B60P 3/20* (2006.01)
*B60K 15/01* (2006.01)
*B60K 15/04* (2006.01)
*B60K 15/03* (2006.01)

(52) U.S. Cl.
CPC .............. *B60P 3/20* (2013.01); *B60K 15/01* (2013.01); *B60K 15/04* (2013.01); *B60K 2015/03019* (2013.01); *B60K 2015/03375* (2013.01); *B60K 2015/0474* (2013.01)

(58) Field of Classification Search
CPC ........... B60P 3/20; B60K 15/01; B60K 15/04; B60K 2015/03019; B60K 2015/03375; B60K 2015/0474
See application file for complete search history.

(56) References Cited

U.S. PATENT DOCUMENTS

| | | | | |
|---|---|---|---|---|
| 3,803,859 A | * | 4/1974 | Kleffmann | B60P 3/20 62/53.2 |
| 5,313,787 A | * | 5/1994 | Martin | F25D 29/001 62/51.1 |
| D409,970 S | * | 5/1999 | Elsdon | D12/218 |
| 6,631,621 B2 | * | 10/2003 | VanderWoude | F17C 13/026 62/185 |
| 8,020,407 B2 | * | 9/2011 | Viegas | F25D 3/105 62/118 |
| 8,500,170 B2 | * | 8/2013 | Pfaff | B62D 35/001 280/837 |
| 8,881,926 B2 | * | 11/2014 | Miyagawa | B23K 10/02 285/332 |
| 9,186,958 B2 | * | 11/2015 | Lurken | B60H 1/3202 |
| 9,506,681 B2 | * | 11/2016 | Lürken | B60H 1/32 |
| 10,960,757 B2 | * | 3/2021 | Pourcheresse | B60K 15/04 |
| 2010/0050660 A1 | * | 3/2010 | Teegen | B60H 1/3232 62/529 |
| 2010/0242534 A1 | * | 9/2010 | Stockton, Jr. | F28F 17/005 165/181 |
| 2019/0299739 A1 | * | 10/2019 | Pourcheresse | B60K 15/04 |

FOREIGN PATENT DOCUMENTS

WO 2017208044 12/2017

* cited by examiner

*Primary Examiner* — Nicolas A Arnett
(74) *Attorney, Agent, or Firm* — Kyle A. Fletcher, Esq.

(57) ABSTRACT

The fuel refilling system for a refrigerated trailer is a fluid transfer system. The fuel refilling system for a refrigerated trailer is configured for use with a tractor. The tractor further has a refrigeration system. The refrigeration system further incorporates a compression pump. The fuel refilling system for a refrigerated trailer receives fuel under pressure from an externally provided source and transports the received fuel to a fuel reservoir. The fuel refilling system for a refrigerated trailer is formed by the trailer and a fuel supply system. The fuel supply system receives the fuel received under pressure from an externally provided source. The fuel supply system releases the fuel received under pressure from an externally provided source into the compression pump.

16 Claims, 4 Drawing Sheets

FUEL REFILLING SYSTEM FOR A REFRIGERATED TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of refrigerated goods vehicles. (B60P3/20)

SUMMARY OF INVENTION

The fuel refilling system for a refrigerated trailer is a fluid transfer system. The fuel refilling system for a refrigerated trailer is configured for use with a tractor. The tractor further comprises a refrigeration system. The refrigeration system further comprises a compression pump. The fuel refilling system for a refrigerated trailer receives fuel under pressure from an externally provided source and transports the received fuel to the fuel reservoir. The fuel refilling system for a refrigerated trailer comprises the trailer and a fuel supply system. The fuel supply system receives the fuel received under pressure from an externally provided source. The fuel supply system releases the fuel received under pressure from an externally provided source into the fuel reservoir.

These together with additional objects, features and advantages of the fuel refilling system for a refrigerated trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the fuel refilling system for a refrigerated trailer in detail, it is to be understood that the fuel refilling system for a refrigerated trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fuel refilling system for a refrigerated trailer.

It is therefore important that the claims be regarded as including such equivalent construction insofar as they do not depart from the spirit and scope of the fuel refilling system for a refrigerated trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
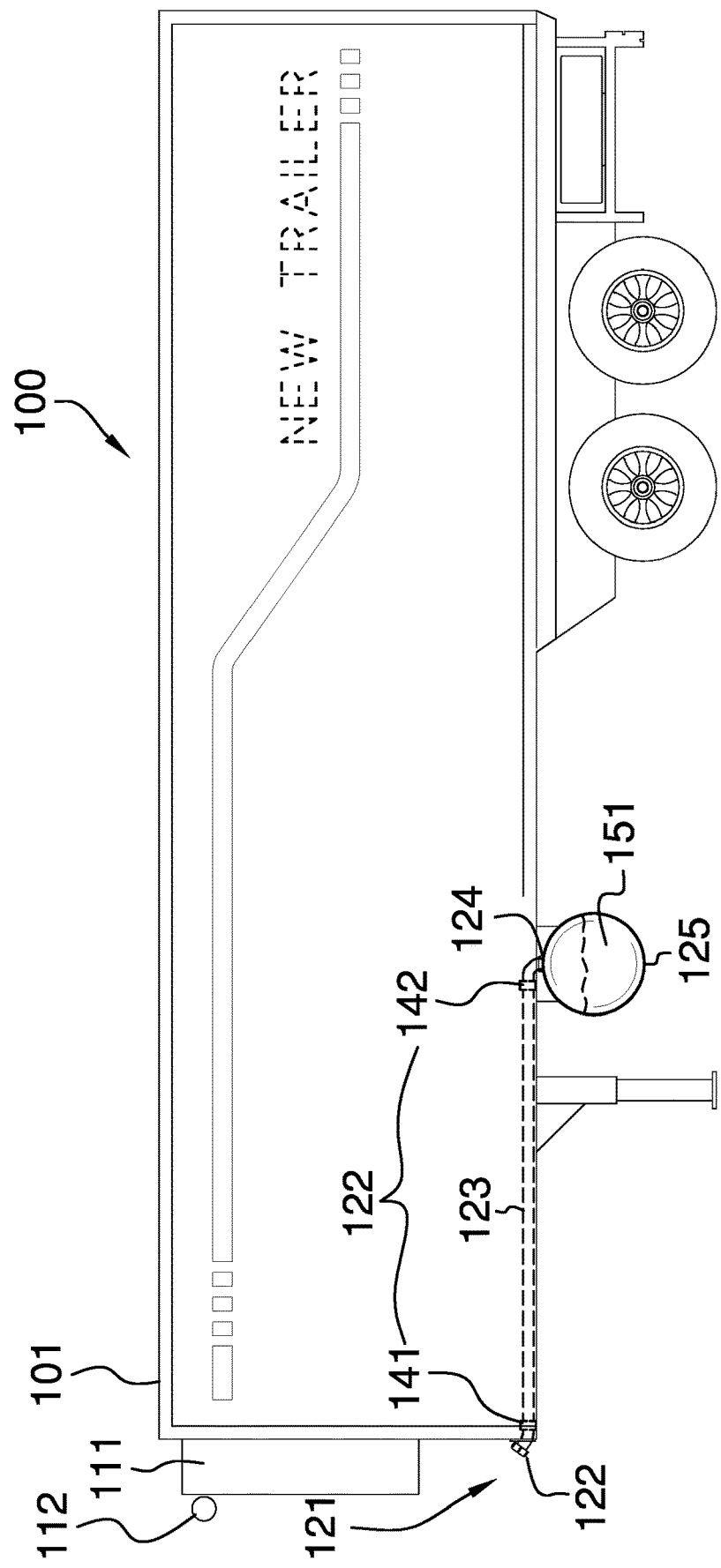
FIG. 1 is a side view of an embodiment of the disclosure.
Figure 2:
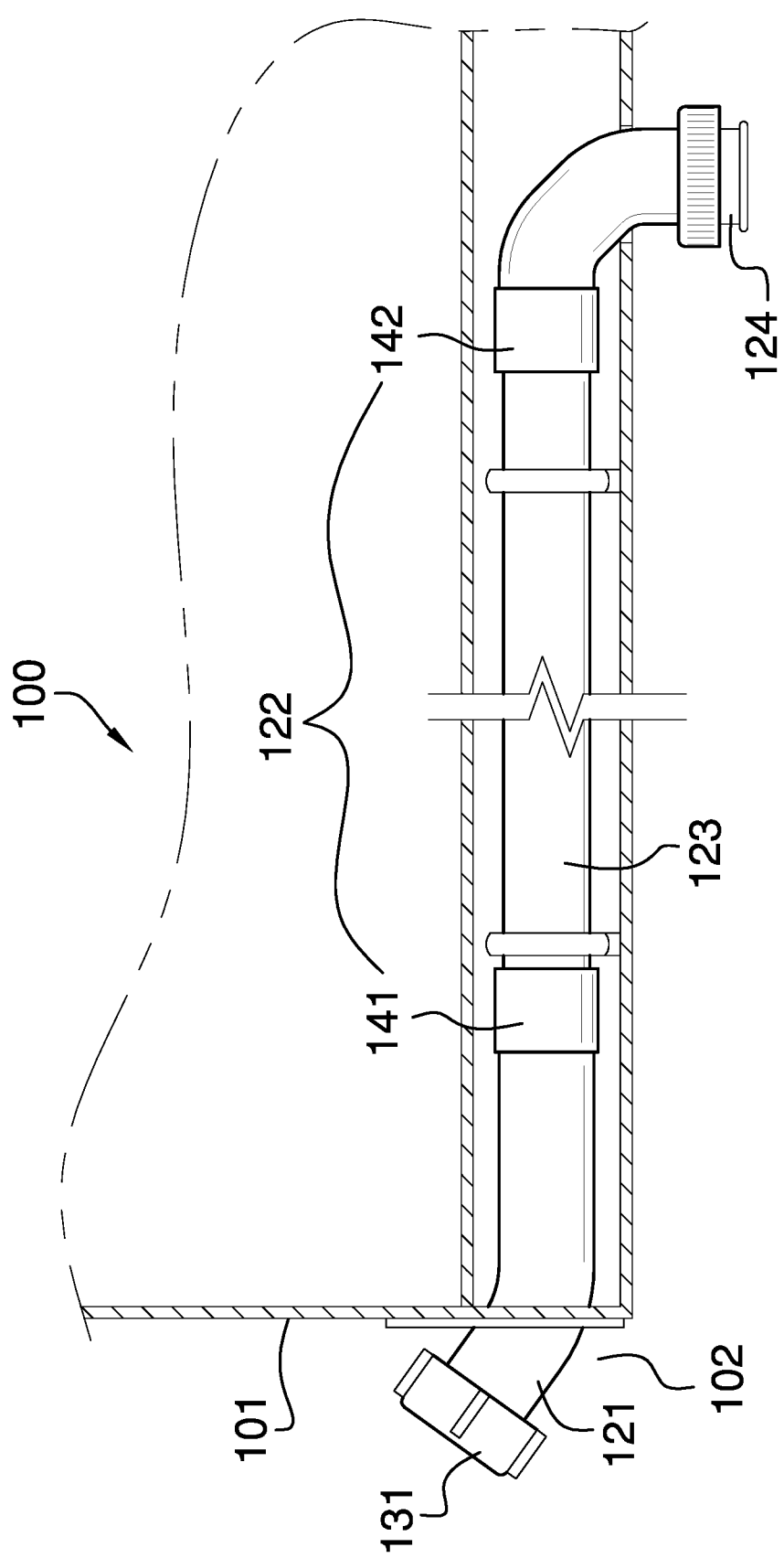
FIG. 2 is a detail view of an embodiment of the disclosure.
Figure 3:
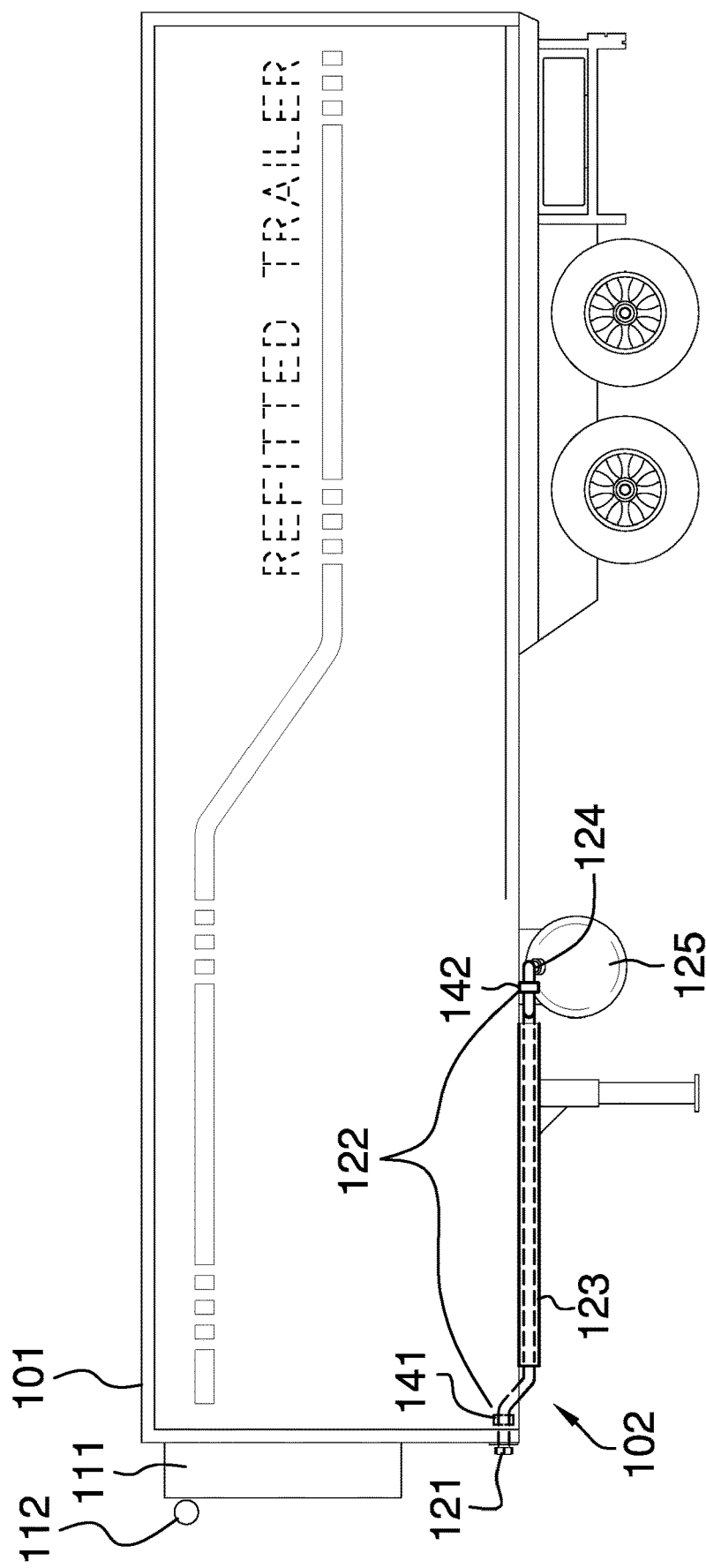
FIG. 3 is a side view of an embodiment of the disclosure.
Figure 4:
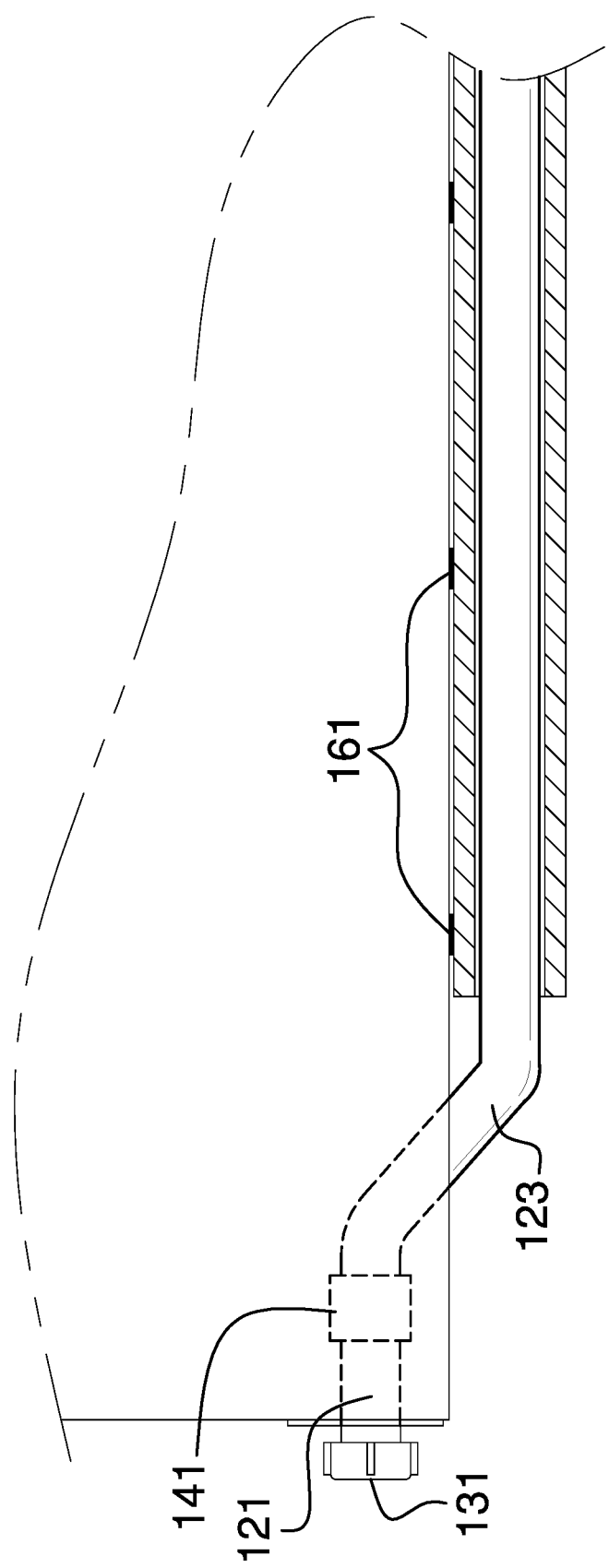
FIG. 4 is a detail view of an embodiment of the disclosure.

Detailed reference will now be made to one or more potential embodiments of the disclosure, which are illustrated in FIGS. 1 through 4.

The fuel refilling system for a refrigerated trailer 100 (hereinafter invention) is a fluid transfer system. The invention 100 is configured for use with a trailer 101. The trailer 101 further comprises a refrigeration system 111. The refrigeration system 111 further comprises a compression pump 112. The invention 100 receives fuel 151 under pressure from an externally provided source and transports the received fuel 151 to the fuel 151 reservoir 125. The invention 100 comprises the trailer 101 and a fuel 151 supply system 102. The fuel 151 supply system 102 receives the fuel 151 received under pressure from an externally provided source. The fuel 151 supply system 102 releases the fuel 151 received under pressure from an externally provided source into the compression pump 112.

The trailer 101 is an unpowered vehicle used to store cargo. The trailer 101 is used to contain cargo during transport. The trailer 101 is configured for use with a tractor. The tractor tows the trailer 101. The trailer 101 is a refrigerated structure. The trailer 101 is used to transport cargo at a controlled temperature. The trailer 101 comprises a refrigeration system 111. The fuel 151 reservoir 125 is a tank used by the refrigeration system 111 to store the fuel 151. The refrigeration system 111 further comprises a compression pump 112.

The refrigeration system 111 is a mechanical implementation of the fluidic circuit of the Carnot cycle. The refrigeration system 111 is used to cool the interior space of the trailer 101. The compression pump 112 is a fuel 151 powered pump that used to pressurize a working gas that is used by the refrigeration system 111 to implement the Carnot cycle. The working gas is a compressible fluid that is pumped through a fluidic circuit used by the refrigeration system 111 to create the Carnot cycle. The compression pump 112 of the refrigeration system 111 places the working gas under pressure such that the working gas generates a cooling effect when the pressure that the working gas is under is subsequently released by the refrigeration system 111.

The fuel 151 reservoir 125 receives the fuel 151 received under pressure from an externally provided source from the fuel 151 supply system 102 for storage.

The fuel 151 supply system 102 is a fluid transfer device. The fuel 151 supply system 102 transports a fuel 151 received under pressure from an externally provided source to the fuel 151 reservoir 125 of the refrigeration system 111 of the trailer 101. The fuel 151 supply system 102 prevents the backflow of fuel 151 from the fuel 151 reservoir 125 after the fluid transport connection with the external source of received fuel 151 has been disconnected from the fuel 151 supply system 102. The fuel 151 supply system 102 comprises an intake fitting 121, a plurality of check valves 122, a fluidic connection 123, and a fuel 151 discharge 124. The intake fitting 121, the plurality of check valves 122, the fluidic connection 123, and the fuel 151 discharge 124 forms a series fluid connection between the fuel 151 received under pressure from an externally provided source and the fuel 151 reservoir 125 of the refrigeration system 111.

The intake fitting 121 is a fitting. The fitting is defined elsewhere in this disclosure. The intake fitting 121 forms a detachable fluid transport connection with the externally provided source of fuel 151 under pressure. The intake fitting 121 is a standardized fitting. The intake fitting 121 receives the fuel 151 received under pressure from an externally provided source and transports the received fuel 151 to a first check valve 141 selected from the plurality of check valves 122. The intake fitting 121 further comprises a cap 131. The cap 131 is a barrier structure. The cap 131 encloses the intake fitting 121 when the intake fitting 121 is not in use.

Each of the plurality of check valves 122 is a valve that prevents the backflow of fuel 151. By backflow is mean the flow of fuel 151 through the fuel 151 supply system 102 in the direction from the fuel 151 reservoir 125 to the intake fitting 121. The check valve is defined elsewhere in this disclosure. The plurality of check valves 122 further comprises a first check valve 141 and a second check valve 142.

The first check valve 141 is a check valve. The first check valve 141 forms a fuel 151 transport structure between the intake fitting 121 and the fluidic connection 123. The first check valve 141 controls the flow of the fuel 151 received under pressure from an externally provided source from the intake fitting 121 into the fluidic connection 123. The first check valve 141 allows the fuel 151 to flow from the intake fitting 121 into the fluidic connection 123. The first check valve 141 prevents the backflow of fuel 151 from the fluidic connection 123 into the intake fitting 121.

The second check valve 142 is a check valve. The second check valve 142 forms a fuel 151 transport structure between the fluidic connection 123 and the fuel 151 discharge 124. The second check valve 142 controls the flow of the fuel 151 received under pressure from an externally provided source from the fluidic connection 123 into the fuel 151 discharge 124. The second check valve 142 allows the fuel 151 to flow from the fluidic connection 123 into the fuel 151 discharge 124. The second check valve 142 prevents the backflow of fuel 151 from the fuel 151 discharge 124 into the fluidic connection 123.

The fluidic connection 123 is a pipe. The fluidic connection 123 forms a fluid transport connection between the first check valve 141 of the plurality of check valves 122 and the second check valve 142 of the plurality of check valves 122. The fluidic connection 123 transports the fuel 151 received under pressure from an externally provided source from the intake fitting 121 to the fuel 151 discharge 124.

In the first potential embodiment of the disclosure, the fluidic connection 123 installs within the interior of the trailer 101. In a second potential embodiment of the disclosure, a plurality of spot welds 161 attach the fluidic connection 123 to the exterior of the trailer 101. The second potential embodiment of the disclosure is intended to support the aftermarket installation of the invention 100 to a trailer 101.

The fuel 151 discharge 124 forms the fluid transport connection between fuel 151 supply system 102 and the compression pump 112 of the refrigeration system 111. The fuel 151 discharge 124 discharges the fuel 151 received under pressure from an externally provided source directly into the compression pump 112.

The following definitions were used in this disclosure:

Ball Valve: As used in this disclosure, a ball valve is a type of valve. The flow of a fluid through a ball valve is controlled using a spherical structure with a cylindrical channel formed through it. When the center axis of the cylindrical channel is aligned with the center axis of the flow path of the ball valve, fluid will flow through the ball valve. When the center axis of the cylindrical channel is perpendicular to the center axis of the flow path of the ball valve, fluid will not flow through the ball valve.

Cap: As used in this disclosure, a cap is a protective cover that encloses a space or opening.

Cargo: As used in this disclosure, cargo refers to one or more objects that are intended to be transported using a vehicle.

Check Valve: As used in this disclosure, a check valve is a valve that permits the flow of fluid in a single direction. Within selected potential embodiments of this disclosure, the check valve is a commercially available product that is selected from the group consisting of a ball valve and a Tesla valve.

Compress: In this disclosure, compress means to force into a smaller space.

Compressed Gas: In this disclosure, compressed gas refers to a gas that has been compressed to a pressure greater than normal temperature and pressure.

Fitting: As used in this disclosure, a fitting is a component that is attached to a first object. The fitting is used to forming a fluidic connection between the first object and a second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Series Circuit: As used in this disclosure, a fluid series circuit refers to a method of connecting a plurality of fluid network elements that are connected to form a single fluid transport path from a first point to a second point in a fluid network.

Fuel: As used in this disclosure, fuel refers to a substance that undergoes a chemical combustion reaction to release chemical potential energy.

Gas: As used in this disclosure, a gas refers to a state (phase) of matter that is fluid and that fills the volume of the structure that contains it. Stated differently, the volume of a gas always equals the volume of its container.

Liquid: As used in this disclosure, a liquid refers to a state (phase) of matter that is fluid and that maintains, for a given pressure, a fixed volume that is independent of the volume of the container.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts.

Port: As used in this disclosure, a port is an aperture formed in an object that allows fluid to flow through the boundary of the object.

Reservoir: As used in this disclosure, a reservoir refers to a container or containment system that is configured to store a liquid.

Tank: As used in this disclosure, a tank is an enclosed hollow structure used to store a fluid.

Tesla Valve: As used in this disclosure, a Tesla valve is a type of check valve that requires the use of no moving parts.

Tow: As used in this disclosure, the term tow is used as a verb that refers to moving an object by pulling on the object with the assistance of an apparatus or device.

Tractor: As used in this disclosure, a tractor is a vehicle having a cab, no body, and a powerful diesel or gasoline powered engine that is used to pull one or more trailers.

Trailer: As used in this disclosure, a trailer is an unpowered wheeled vehicle that is towed by a powered vehicle such as a tractor.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. A fuel resupply system comprising
a trailer and a fuel supply system;
wherein the fuel supply system receives a fuel received under pressure from an externally provided source;
wherein the fuel resupply system is a fluid transfer device;
wherein the fuel resupply system is configured for use with a trailer;
wherein the fuel resupply system transports the received fuel to the trailer;
wherein the trailer further comprises a refrigeration system;
wherein the refrigeration system further comprises a compression pump;
wherein the fuel resupply system receives fuel under pressure from an externally provided source and stores the received fuel;
wherein the fuel supply system releases the stored fuel into the compression pump;
wherein the fuel supply system comprises an intake fitting, a plurality of check valves, a fluidic connection, and a fuel discharge;
wherein the fuel discharge forms the fluid transport connection between the fuel supply system and the compression pump of the refrigeration system;
wherein the fuel discharge discharges the fuel received under pressure from an externally provided source directly into the compression pump.

2. The fuel resupply system according to claim 1
wherein the refrigeration system is a mechanical implementation of the fluidic circuit of the Carnot cycle;
wherein the compression pump is used to power the Carnot cycle.

3. The fuel resupply system according to claim 2 wherein the fuel supply system transports the fuel received under pressure from an externally provided source to the fuel reservoir.

4. The fuel resupply system according to claim 3 wherein the fuel supply system prevents the backflow of fuel from the fuel reservoir after the fluid transport connection with the external source of received fuel has been disconnected from the fuel supply system.

5. The fuel resupply system according to claim 4
wherein the intake fitting, the plurality of check valves, the fluidic connection, and the fuel discharge forms a series fluid connection between the fuel received under pressure from an externally provided source and the fuel reservoir.

6. The fuel resupply system according to claim 5
wherein the intake fitting is a fitting;
wherein the intake fitting forms a detachable fluid transport connection with the externally provided source of fuel under pressure.

7. The fuel resupply system according to claim 6 wherein the intake fitting receives the fuel received under pressure from an externally provided source and transports the received fuel to a first check valve selected from the plurality of check valves.

8. The fuel resupply system according to claim 7
wherein each of the plurality of check valves is a valve that prevents the backflow of fuel;
wherein by backflow is mean the flow of fuel through the fuel supply system in the direction from the fuel reservoir to the intake fitting.

9. The fuel resupply system according to claim 8
wherein the plurality of check valves further comprises a first check valve and a second check valve;
wherein the first check valve forms a fuel transport structure between the intake fitting and the fluidic connection;
wherein the second check valve forms a fuel transport structure between the fluidic connection and the fuel discharge.

10. The fuel resupply system according to claim 9
wherein the fluidic connection is a pipe;
wherein the fluidic connection transports the fuel received under pressure from an externally provided source from the intake fitting to the fuel discharge.

11. The fuel resupply system according to claim 10 wherein the fluidic connection forms a fluid transport connection between the first check valve of the plurality of check valves and the second check valve of the plurality of check valves.

12. The fuel resupply system according to claim 11
wherein the first check valve is a check valve;
wherein the first check valve controls the flow of the fuel received under pressure from an externally provided source from the intake fitting into the fluidic connection;
wherein the first check valve allows the fuel to flow from the intake fitting into the fluidic connection;
wherein the first check valve prevents the backflow of fuel from the fluidic connection into the intake fitting.

13. The fuel resupply system according to claim 12
wherein the second check valve is a check valve;
wherein the second check valve controls the flow of the fuel received under pressure from an externally provided source from the fluidic connection into the fuel discharge;
wherein the second check valve allows the fuel to flow from the fluidic connection into the fuel discharge;
wherein the second check valve prevents the backflow of fuel from the fuel discharge into the fluidic connection.

14. The fuel resupply system according to claim 13
wherein the intake fitting further comprises a cap;
wherein the cap is a barrier structure;
wherein the cap encloses the intake fitting when the intake fitting is not in use.

15. The fuel resupply system according to claim 14 wherein the fluidic connection installs within the interior of the trailer.

16. The fuel resupply system according to claim 15 wherein a plurality of spot welds attach the fluidic connection to the exterior of the trailer.

* * * * *